United States Patent
Yokoyama

(10) Patent No.: US 9,739,344 B2
(45) Date of Patent: Aug. 22, 2017

(54) CHAIN

(71) Applicant: TSUBAKIMOTO CHAIN CO., Osaka-shi, Osaka (JP)

(72) Inventor: Masanori Yokoyama, Osaka (JP)

(73) Assignee: TSUBAKIMOTO CHAIN CO., Osaka (JP)

( * ) Notice: Subject to any disclaimer, the term of this patent is extended or adjusted under 35 U.S.C. 154(b) by 0 days.

(21) Appl. No.: 14/850,230

(22) Filed: Sep. 10, 2015

(65) Prior Publication Data

US 2016/0108990 A1    Apr. 21, 2016

(30) Foreign Application Priority Data

Oct. 16, 2014    (JP) .................................. 2014-211679

(51) Int. Cl.
*F16G 13/06*    (2006.01)

(52) U.S. Cl.
CPC .................................... *F16G 13/06* (2013.01)

(58) Field of Classification Search
CPC ....................................................... F16G 13/06
USPC ....................................................... 474/231
See application file for complete search history.

(56) References Cited

U.S. PATENT DOCUMENTS

| 6,689,003 | B2 * | 2/2004 | Wigsten | .................. F16G 13/18 474/212 |
| 9,151,359 | B1 * | 10/2015 | Hogan | ..................... F16G 13/06 |
| 2004/0261240 | A1 | 12/2004 | Satou et al. | |
| 2010/0167858 | A1 * | 7/2010 | Baba | ....................... F16G 13/18 474/231 |

FOREIGN PATENT DOCUMENTS

JP    2005-21911 A    1/2005

* cited by examiner

*Primary Examiner* — William E Dondero
*Assistant Examiner* — Mark K Buse
(74) *Attorney, Agent, or Firm* — Westerman, Hattori, Daniels & Adrian, LLP

(57) ABSTRACT

An object of the present invention is to provide a chain that reduces warping of connecting pins and prevents local wear in the bushings and connecting pins without causing an increase in the chain weight. Provided is a chain 10 including a plurality of inner links 20 formed by inner plates 30 and bushings 40, and a plurality of outer links 50 formed by outer plates 60 and connecting pins 70, wherein the plate height of each of the inner plates 30 as measured along an imaginary line L1 passing through the center of a bushing hole 31 and extending in a chain height direction is larger than a chain pitch P.

2 Claims, 4 Drawing Sheets

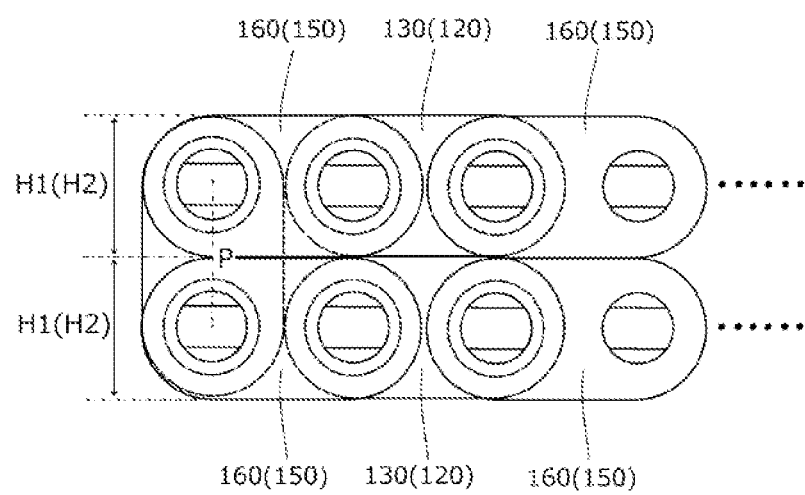
FIG. 5A
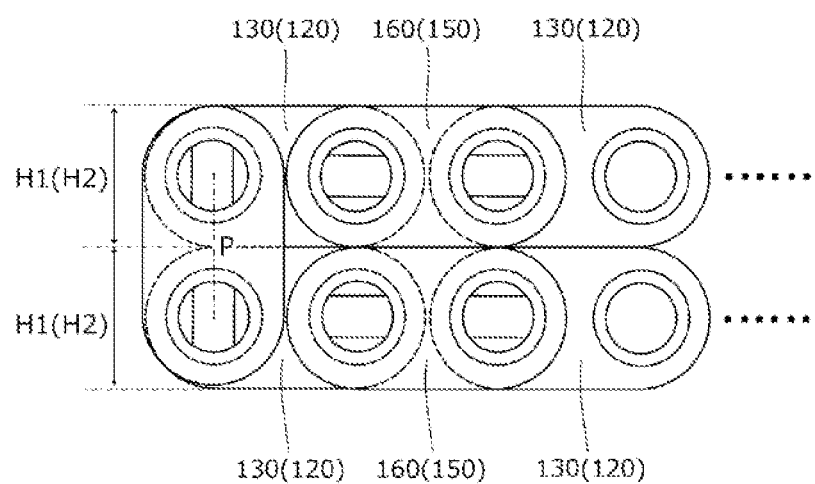
Related Art  FIG. 5B

CHAIN

BACKGROUND OF THE INVENTION

1. Field of the Invention

The present invention relates to a chain having a plurality of inner links configured by coupling a pair of front and rear bushings to a pair of left and right inner plates, and a plurality of outer links configured by coupling a pair of front and rear connecting pins to a pair of left and right outer plates, the inner links and outer links being alternately and pivotably coupled together in the longitudinal direction of the chain by inserting the connecting pins into the bushings.

2. Description of the Related Art

A chain 110 has been known, as shown in FIG. 4, which includes a plurality of inner links 120 configured by coupling a pair of front and rear bushings 140 to a pair of left and right inner plates 130, and a plurality of outer links 150 configured by coupling a pair of front and rear connecting pins 170 to a pair of left and right outer plates 160, the inner links 120 and outer links 150 being alternately and pivotably coupled together in the longitudinal direction of the chain by inserting the connecting pins 170 into the bushings 140 (see, for example, Japanese Patent Application Laid-open No. 2005-021911).

Such a chain 110 was conventionally encased in a packing box when delivered as a product or at some such time, such that the entire chain 110 is bent in a U-shape in which the outer links 150 on both sides of one inner link 120 pivot relative to the inner link 120 as shown in FIG. 5A, or the inner links 120 on both sides of one outer link 150 pivot relative to the outer link 150 as shown in FIG. 5B.

If the links 120 or 150 on both sides of the link 150 or 120 that serves as a pivot base open in a V shape at this time, the chain cannot be encased in a compact manner. For this reason, the plate height H1 of the inner plates 130 and the plate height H2 of the outer plates 160 were set not greater than the chain pitch P. FIG. 5A and FIG. 5B show an example in which the plate height H1 of the inner plates 130 and the plate height H2 of the outer plates 160 are set the same as the chain pitch P.

SUMMARY OF THE INVENTION

Meanwhile, the bushings 140 (and connecting pins 170) tend to be designed with a larger diameter in recent years for increasing the chain strength. With the increase in the diameter of the bushings 140, the bushing holes 131 in the inner plates 130 are made larger, as a result of which the area surrounding the bushing holes 131 becomes smaller and the plate strength of the inner plates 130 is reduced. This in turn has led to a design with an increased plate thickness of the inner plates 130 so as to ensure the strength of the surrounding area of the bushing holes 131 such as not to cause the plate height H1 of the inner plates 130 to exceed the chain pitch P for the reason mentioned above.

An increased plate thickness of the inner plates 130, however, means a weight increase of the inner plates 130, as well as necessitates an increase in the length of the bushings 140 or connecting pins 170. This causes the connecting pins 170 to more readily warp by the chain tension, and leads to a problem of local wear occurring in the bushings 140 or connecting pins 170 more easily.

The present invention is directed at solving these problems and it is an object of the invention to provide a chain that reduces warping of connecting pins and prevents local wear in the bushings and connecting pins without causing an increase in the chain weight.

The present invention solves the problems above by providing a chain including a plurality of inner links configured by coupling a pair of front and rear bushings to a pair of left and right inner plates, and a plurality of outer links configured by coupling a pair of front and rear connecting pins to a pair of left and right outer plates, the inner links and outer links being alternately and pivotably coupled together in a longitudinal direction of the chain by inserting the connecting pins into the bushings, wherein a plate height of each of the inner plates as measured along an imaginary line passing through a center of a bushing hole in the inner plate and extending in a chain height direction is larger than a chain pitch.

The term "chain pitch" used herein refers to the distance in the longitudinal direction of the chain between the centers of the pair of front and rear connecting pins coupled to the outer plate.

In one aspect of the present invention, the plate height of each of the inner plates as measured along an imaginary line passing through a center of a bushing hole in the inner plate and extending in a chain height direction is larger than a chain pitch, whereby the thickness of the inner plates can be reduced while ensuring the plate strength of the inner plates relative to the chain tension, so that the chain weight can be reduced, and the length of the connecting pins or bushings can be made shorter.

With shorter connecting pins, the warping of the connecting pins due to the chain tension can be reduced, and local wear that tends to occur in the connecting pins or bushings when the connecting pins warp can be prevented.

In another aspect of the present invention, a first width defined as a distance from an outer edge of the bushing hole in the inner plate to an outer edge of the inner plate along the imaginary line passing through the center of the bushing hole in the inner plate and extending in the chain height direction is set 1.1 times or more a second width defined as a distance from an outer edge of the bushing hole to an outer edge of the inner plate along a second imaginary line passing through the center of the bushing hole and extending in a longitudinal direction of the chain, whereby the plate strength relative to the tensional stress and compressive stress applied to the inner plates when the chain is stretched can be achieved in good balance without causing an increase in the size of the inner plates.

In another aspect of the present invention, a plate height of each of the outer plates is set not greater than the chain pitch. When the entire chain is bent in a U-shape to be encased in a packing box, the outer links on both sides of an inner link pivot relative to the inner link, so that the outer links on both sides of the inner link that serves as a pivot base are prevented from opening in a V-shape, and the chain can be encased in the packing box compactly.

BRIEF DESCRIPTION OF THE DRAWINGS

FIG. 5A and FIG. 5B are side views illustrating a conventional chain in a folded state.

DESCRIPTION OF THE PREFERRED EMBODIMENTS

A chain 10 according to one embodiment of the present invention will be hereinafter described with reference to the drawings.

Figure 1:
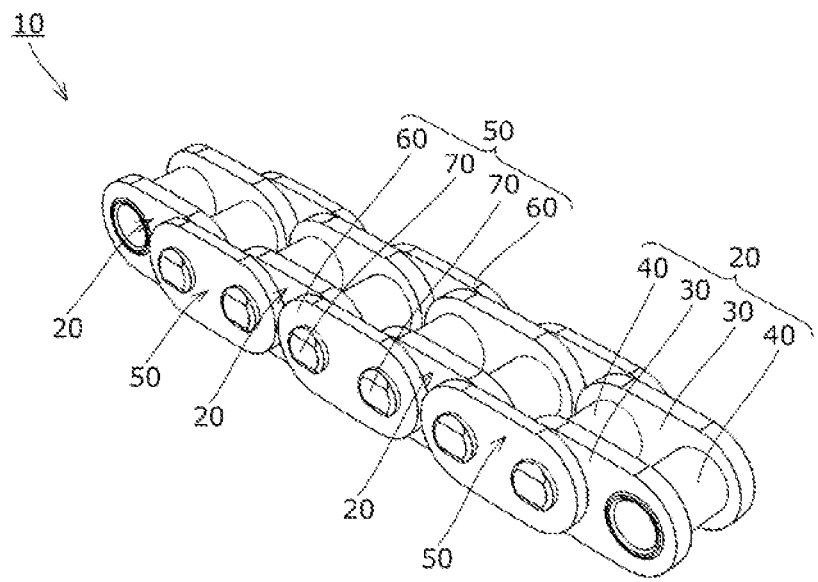
FIG. 1 is a perspective view illustrating a chain according to one embodiment of the present invention.
Figure 2:
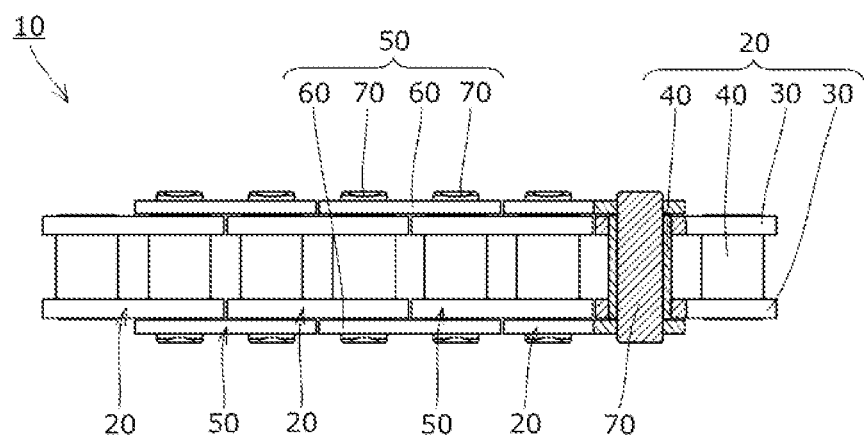
FIG. 2 is a partially cross-sectional plan view of the chain.

As shown in FIG. 1, the chain 10 includes a plurality of inner links 20 configured by coupling a pair of front and rear bushings 40 to a pair of left and right inner plates 30, and a plurality of outer links 50 configured by coupling a pair of front and rear connecting pins 70 to a pair of left and right outer plates 60. The inner links 20 and outer links 50 are alternately and pivotably coupled together in the longitudinal direction of the chain by inserting the connecting pins 70 into the bushings 40.

Each inner plate 30 is formed with a pair of front and rear bushing holes 31 into which the bushings 40 are inserted, and each outer plate 60 is formed with a pair of front and rear in holes 61 into which the connecting pins 70 are inserted.

The dimensions of the plates 30 and 60, which are the characteristic feature of this embodiment, will be explained with reference to FIG. 3.

Figure 3:
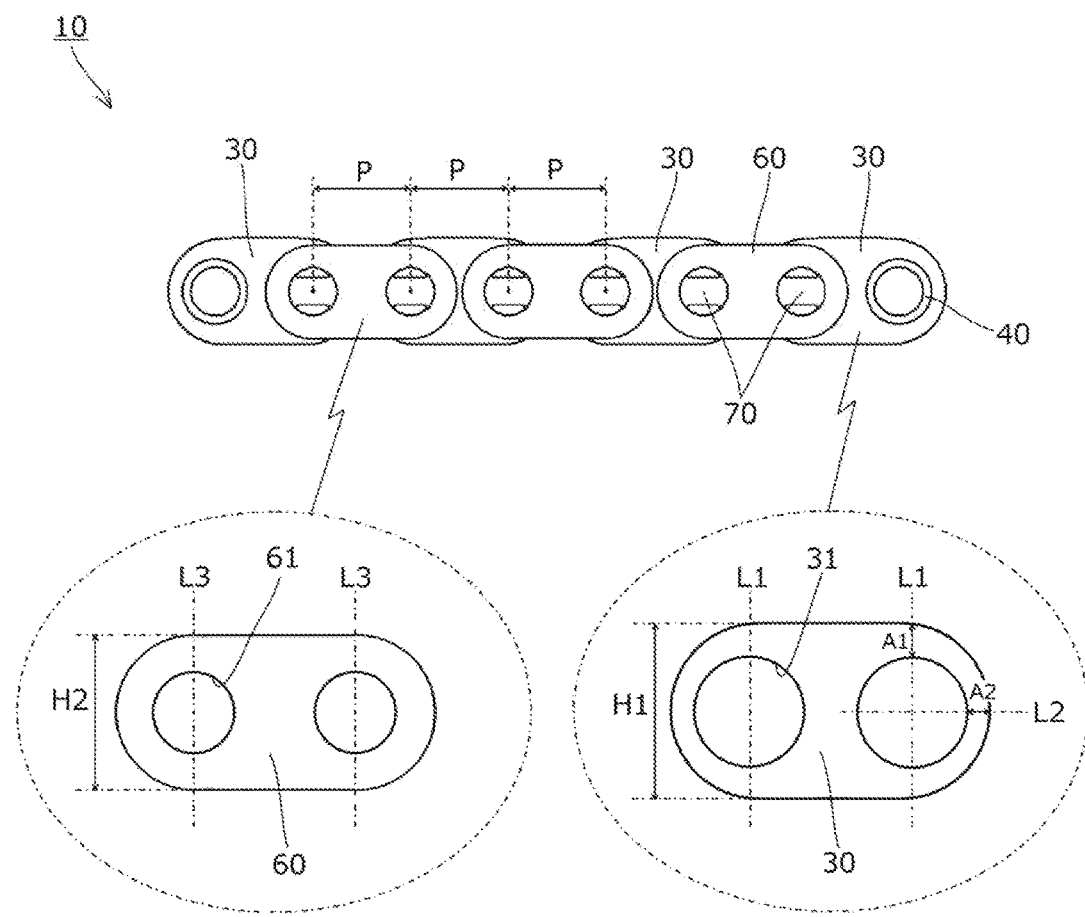
FIG. 3 is a diagram explaining various dimensions of an inner plate and an outer plate.
Figure 4:
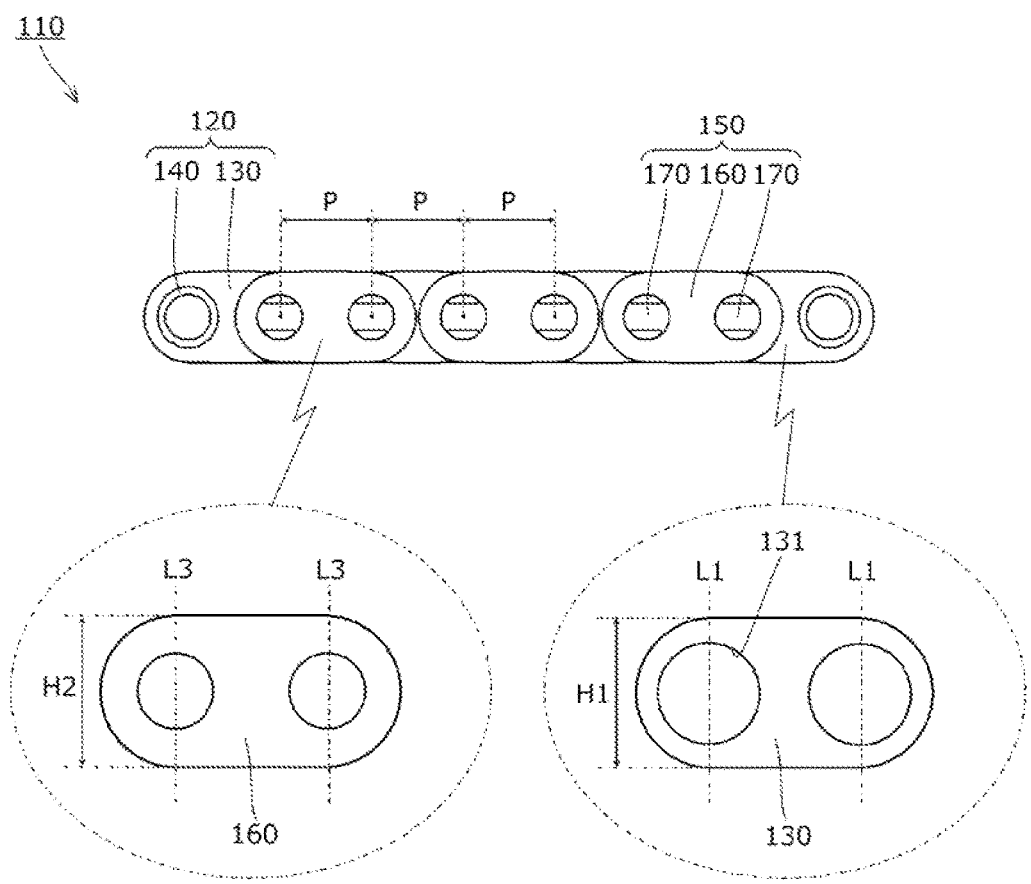
FIG. 4 is a diagram explaining various dimensions of an inner plate and an outer plate of a conventional chain.

In the following description, as shown in FIG. 3, an imaginary line passing through the center of the bushing hole 31 and extending along a chain height direction is defined as a first imaginary line L1, an imaginary line passing through the center of the bushing hole 31 and extending in the longitudinal direction of the chain is defined as a second imaginary line L2, and an imaginary line passing through the center of the pin hole 61 and extending in the chain height direction is defined as a third imaginary line L3.

Firstly, the plate height H1 of the inner plate 30 along the first imaginary line L1 is set larger than the chain pitch P.

The plate height H2 of the outer plate 50 along the third imaginary line L3 is set larger than the chain pitch P and the same as the plate height H1 of the inner plate 30.

A first width A1 defined as the distance from an outer edge of the bushing hole 31 to the outer edge of the inner plate 30 along the first imaginary line L1 is set 1.1 times or more a second width A2 defined as the distance from the outer edge of the bushing hole 31 to the outer edge of the inner plate 30 along the second imaginary line L2.

The inner plate 30 is formed oval in this embodiment as shown in FIG. 3, so that the upper and lower edges of the inner plate 30 extend linearly inside the left and right imaginary lines L1. However, the specific shape of the inner plate 30 is not limited to the example given above. The upper and lower edges of the inner plate 30 may be curved outwardly, or inwardly. The same applies to the outer plate 60.

While one embodiment of the present invention has been described in detail, the present invention is not limited to the above-described embodiment and may be carried out with various design changes without departing from the scope of the present invention set forth in the claims.

For example, while the chain was described as a bushing chain in the embodiment above, the specific form of the chain is not limited to this and the chain may be a roller chain, for example.

The chain of the present invention may be used in any specific applications such as a timing chain or a conveyor chain.

While the chain described in the embodiment above is a single-row chain having one inner link arranged in a chain width direction, the chain may be configured as a multiple-row chain having a plurality of inner links arranged in the chain width direction.

While the outer plate described in the embodiment above has a plate height as measured along the third imaginary line larger than the chain pith P and the same as the plate height of the inner plate, the dimensions of the outer plate are not limited to those described above. For example, the plate height of the outer plate as measured along the third imaginary line may be set not greater than the chain pitch.

What is claimed is:

1. A chain comprising:
   a plurality of inner links configured by coupling a pair of front and rear bushings to a pair of left and right inner plates; and
   a plurality of outer links configured by coupling a pair of front and rear connecting pins to a pair of left and right outer plates,
   the inner links and the outer links being alternately and pivotably coupled together in a longitudinal direction of the chain by inserting the connecting pins into the bushings,
   wherein a plate height of each of the inner plates as measured along an imaginary line passing through a center of a bushing hole in the inner plate and extending in a chain height direction is larger than a chain pitch, and
   a plate height of each of the outer plates as measured along a third imaginary line passing through a center of a pin hole in the outer plate and extending in the chain height direction is set not greater than the chain pitch.

2. The chain according to claim 1, wherein a first width defined as a distance from an outer edge of the bushing hole in the inner plate to an outer edge of the inner plate along the imaginary line is set 1.1 times or more a second width defined as a distance from an outer edge of the bushing hole to an outer edge of the inner plate along a second imaginary line passing through the center of the bushing hole and extending in the longitudinal direction of the chain.

* * * * *